United States Patent [19]

Gasparro

[11] Patent Number: 4,778,647

[45] Date of Patent: Oct. 18, 1988

[54] VIBRATION-DAMPING EXTENDER FOR A THIMBLE GUIDE

[75] Inventor: Michael R. Gasparro, Penn Hills, Pa.

[73] Assignee: Westinghouse Electric Corp., Pittsburgh, Pa.

[21] Appl. No.: 829,733

[22] Filed: Feb. 14, 1986

[51] Int. Cl.$^4$ ............................................. G21C 17/00
[52] U.S. Cl. .................................. 376/347; 376/245; 376/292; 376/254
[58] Field of Search ............... 376/254, 277, 463, 285, 376/245, 255, 353, 449, 450, 291, 292, 441, 442

[56] References Cited

U.S. PATENT DOCUMENTS

| 3,816,245 | 6/1974 | Bevilacqua . |
| 3,971,698 | 7/1976 | Wolff et al. . |
| 4,198,272 | 4/1980 | Salmon . |
| 4,617,171 | 10/1986 | Feutrel ............................ 376/285 X |
| 4,670,211 | 6/1987 | Gaunt et al. ........................ 376/245 |

FOREIGN PATENT DOCUMENTS

2592517 7/1988 France .
2129189A 5/1984 United Kingdom .

Primary Examiner—Herbert B. Guynn
Assistant Examiner—John S. Maples, Jr.
Attorney, Agent, or Firm—D. C. Abeles

[57] ABSTRACT

A thimble guide extender for use in a nuclear power plant shields the thimble from turbulence and absorbs vibration from it to reduce wear. The extender includes an extension element which is secured to the thimble guide, a spring bushing which is attached to the extension element and which contacts the thimble, and a cap. In one embodiment the cap clamps the spring bushing, and in other embodiments it simply shields the bushing from turbulence. In one embodiment the spring bushing is an element having a cylindrical portion on one side and dimpled spring legs on the other, in another embodiment the spring bushing is an element having bent spring legs on either side, and in another embodiment the spring bushing is provided by dimpled spring legs that are integral with the extension element. The extension element is provided with locking fingers which secure the extension element to the thimble guide.

18 Claims, 5 Drawing Sheets

VIBRATION-DAMPING EXTENDER FOR A THIMBLE GUIDE

BACKGROUND OF THE INVENTION

The present invention relates to an extender for a thimble guide in a nuclear power plant, and more particularly to an extender which shields the thimble from turbulence and which absorbs vibration from the thimble.

Figure 1:
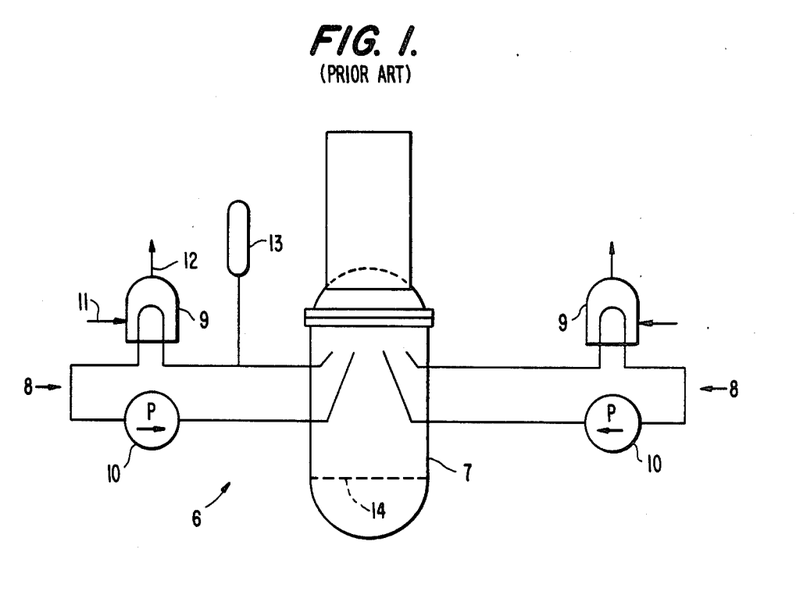
FIG. 1 schematically illustrates major operative elements of a typical pressurized water reactor.

A typical pressurized water reactor 6 is schematically illustrated in FIG. 1 and includes a reactor vessel 7 which contains nuclear fuel, a coolant (water) which is heated by the nuclear fuel, and means for monitoring and controlling the nuclear reaction. The reactor vessel 7 is cylindrical, and is provided with a permanent hemispherical bottom and a removable hemispherical top. Hot water is conveyed from and returned to vessel 7 by a reactor coolant system which includes one or more reactor coolant loops 8 (usually two, three, or four loops, depending upon the power-generating capacity of the reactor, although only two loops are illustrated in FIG. 1). Each loop 8 includes a pipeline to convey hot water from the reactor vessel 7 to a steam generator 9, a pipeline to convey the water from the steam generator 9 back to the reactor vessel 7, and a pump 10. A steam generator 9 is essentially a heat exchanger which transfers heat from the reactor coolant system to water received at inlet 11 from a source that is isolated from the reactor coolant system; the resulting steam is conveyed via outlet 12 to a turbine (not illustrated) to generate electricity. During operation of the reactor 6, the water within the vessel and the coolant system is maintained at a controlled high pressure by pressurizer 13 to keep it from boiling as it is heated by the nuclear fuel.

Nuclear fuel is supplied to the reactor vessel 7 in the form of a number of fuel assemblies. Each fuel assembly includes a base element called a bottom nozzle and a bundle of fuel rods and tubular guides which are supported on the bottom nozzle. The fuel rods have cylindrical housings which are filled with pellets of fissionable material enriched with U-235. The tubular guides accommodate measuring instruments and movably mounted control rods of neutron-moderating material. A typical fuel assembly for a pressurized water reactor is about 4.1 meters long, about 19.7 centimeters wide, and has a mass of about 585 kg, and a typical four loop reactor might contain 196 such fuel assemblies supported parallel to one another on a core plate within the reactor vessel. After a service life during which the U-235 enrichment of the fuel assemblies is depleted, the reactor 6 is shut down, the pressure within the vessel 7 is relieved, the hemispherical top of the vessel is removed, and the spent fuel assemblies are replaced by new ones.

A number of measuring instruments are employed to promote safety and to permit proper control of the nuclear reaction. Among other measurements, a neutron flux map is generated periodically, such as every 28 days, using data gathered by neutron flux detectors which are moved through a number of randomly selected fuel assemblies. To guide the flux detectors during their periodic journeys, closed stainless steel tubes known as flux thimbles extend through the bottom of the reactor vessel 7 and into the fuel assemblies which have been selected as measuring sites. This will be explained in more detail with reference to FIG. 2.

Figure 2:
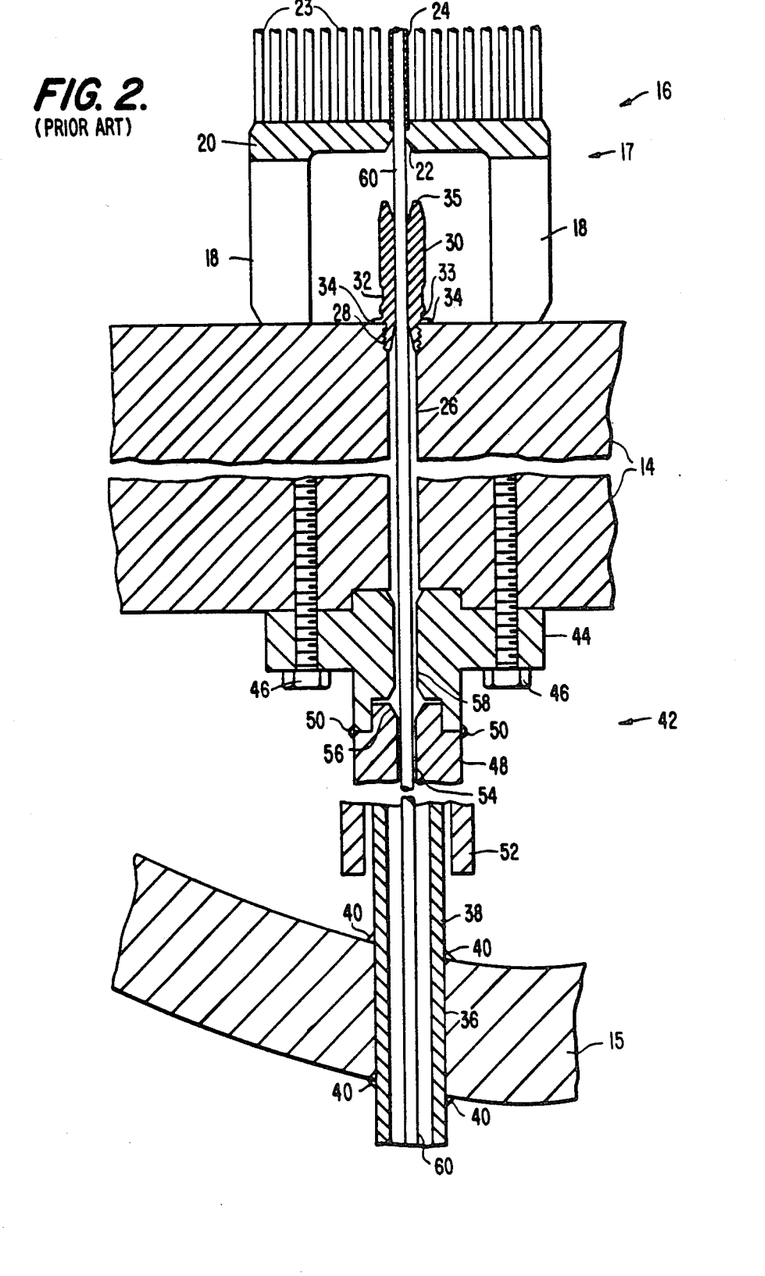
FIG. 2 is a sectional view generally illustrating features within the reactor vessel of FIG. 1, including the lower core plate, a fuel assembly supported by the core plate, and a thimble guide directed toward the fuel assembly.

In FIG. 2, a thick, lower core plate 14 is horizontally mounted within reactor vessel 7, with reference number 15 identifying a portion of the hemispherical bottom end wall of the vessel 7. A number of fuel assemblies, including fuel assembly 16, are supported in an orderly array on plate 14. Fuel assembly 16 includes a bottom nozzle 17 having four legs 18 which are joined to a platform portion 20 with a centrally disposed aperture 22 in it. A number of fuel rods 23 are bundled together and supported on platform portion 20. Within this bundle is an instrumentation tube 24 which is aligned with aperture 22 and which extends to the top nozzle (not illustrated) of fuel assembly 16.

A bore 26 having a threaded region 28 extends through core plate 14 in alignment with aperture 22. A conventional thimble guide 30, which may be configurated as illustrated in FIG. 2, is provided with a threaded portion and with a recessed wrench-engaging region 32 which permits technicians to screw guide 30 into threaded region 28 of plate 14 during fabrication of the reactor vessel 7. An annular groove 33 is positioned beneath region 32. After guide 30 is screwed into place, welds 34 are added for additional security. Typically guide 30 is 3.38 inches (8.58 cm) high, from the upper surface of plate 14 to the upper lip 35 of guide 30, and there is a gap of 1.37 inches (3.48 cm) between upper lip 35 and aperture 22.

A bore 36 extends through vessel wall 15 in alignment with bore 26. A vessel-penetration sleeve 38 having an outer diameter of about 1.5 inches (3.81 cm) extends through bore 36 and is welded at 40 to provide a seal which is resistant to high pressure. A bottom mounted instrumentation column 42 mounted on plate 14 extends between bore 26 and sleeve 38. Column 42 includes a fitting 44 which is attached to plate 14 by bolts 46, an upper pipe element 48 which is joined to fitting 44 by welds 50, and a lower pipe element 52 which is joined coaxially to element 48 at a tie plate (not illustrated). Lower pipe element 52 has an inner diameter of 2 inches (5.08 cm), so that there is a gap between sleeve 38 and element 52.

In a typical four-loop pressurized water reactor (having 196 fuel assemblies 16), 58 of the fuel assemblies 16 would be randomly selected for neutron flux monitoring. Accordingly, in such a reactor it will be apparent that there would be 58 guides 30, each communicating via a respective bore 26 and bottom mounted instrumentation column 42 with a respective vessel-penetration sleeve 38. During fabrication, sleeves 38 would be installed in the reactor vessel wall 15 and guides 30 and bottom mounted instrumentation columns 42 would be installed on core plate 14, the columns 42 being secured to one another by tie plates (not illustrated). Then the core plate 14 and attached structures would be lowered into the vessel, with the sleeves 38 fitting into elements 52. In the resulting structure, the upper ends (not illustrated) of sleeves 38 are spaced apart from the lower ends (not illustrated) of upper pipe elements 48, so that sleeves 38 are not in fluid-tight communication with bottom mounted instrumentation columns 42.

Upper pipe element 48 has a bore 54 which terminates in a flared region 56. The bore 58 of fitting 44 has a diameter slightly greater than that of bore 54 and has flared regions at either end. The bore 26 typically has a diameter of 0.75 inches (1.91 cm), which is slightly greater than the diameter of bore 58. It will be noted that the channel provided by bores 54, 58, and 26 becomes progressively wider from upper pipe element 48, to fitting 44, to bore 26. This construction facilitates manufacture of the reactor and provides guidance for flux thimble 60 (to be discussed shortly) while avoiding the possibility that it might become stuck in the channel.

Flux thimble 60 is a long stainless steel tube which begins at a plate (known as a seal table, not illustrated) outside the reactor vessel 7 and which has a closed end (not illustrated) that is normally disposed inside a fuel assembly 16. Thimble 60 slidably extends through tube 24, guide 30, bore 26, bottom mounted instrumentation column 42, and sleeve 38. A stainless steel guide tube (not illustrated) is welded to the outer end of sleeve 36, and thimble 60 extends within the guide tube to the seal table, which is typically located in a shielded position at an elevation near the top of vessel 7. Since the interior of the vessel 7 is in fluid communication with the interior of sleeve 38, it will be apparent that the guide tube provides a pressure boundary which extends around thimble 60 from wall 15 to the seal table, where a high pressure seal (not illustrated) is provided between the inner wall of the guide tube (not illustrated) and the outer wall of thimble 60. The net result is that thimble 60 provides a low-pressure access channel into the reactor vessel 7 from a shielded position outside of the reactor vessel 7.

A flux detector (not illustrated), about 2 inches (5 cm) long, is slidably accommodated within thimble 60 and is attached to a flexible push-pull cable (not illustrated) which extends through thimble 60 to flux-mapping equipment (not illustrated) located beyond the seal table (not illustrated). At periodic intervals, typically once every 28 days, the flux detectors are pushed to the tops of thimbles 60 and are then slowly withdrawn through the fuel assemblies 16 as flux measurements are taken at different heights to provide a neutron flux map of the interior of the reactor vessel 7.

Normally thimbles 60 remain inserted in the instrumentation tubes 24 of the randomly selected fuel assemblies 16 between the periodic flux mapping operations. Thimbles 60 must be withdrawn from fuel assemblies 16, however, at intervals of 12-18 months when the reactor 6 is shut down for refueling and fuel shuffling. During the refueling operation the nuclear reaction is terminated, the pressure within the reactor vessel 7 is relieved, and the guide tubes (not illustrated) are unsealed from the thimbles 60 at the seal table (not illustrated). The thimbles 60 (which are somewhat flexible) are then withdrawn by a distance of about 14 feet (4.27 meters) to free them from the spent fuel assemblies 16, which are thereupon removed via remote control and replaced by fresh fuel assemblies 16. Thimbles 60 are then driven into the fresh fuel assemblies 16, the reactor vessel 7 and seal table are sealed, and power generation begins anew.

The conventional thimble guide 30 iof FIG. 2 has several shortcomings. It has been found that considerable turbulence exists during operation of a reactor 6 in the region between the upper surface of core plate 14 and the lower surfaces of platform portions 20 of fuel assemblies 16. Guides 30 expose a significant portion of thimbles 60 to this turbulence, which may, depending upon dimensional tolerances, vibrate thimbles 60 and increases wear to an undesirable extent. Simply increasing the length of guides 30 would be undesirable because fuel assembly designs may change, including the lengths of legs 18. Since guides 30 are permanently installed at the time the vessel 7 is built, any particular length for guides 30 that is selected at that time might make it impossible to take advantage of future design improvements in fuel assemblies. Even apart from this consideration, it would be undesirable to make solid guides 30 long enough to touch the bottom nozzles 17 of a particular fuel assembly design because very slight dimensional inaccuracies might upset the footing of legs 18 and leave the fuel assemblies tottering on top of one or more guides 30. Furthermore, it has been found that fluid flow in the gap around a thimble 60 due to the progressively widening channel from element 48 to fitting 44 to bore 26 may be sufficient to cause vibrations which increase wear.

SUMMARY OF THE INVENTION

Accordingly, an object of the present invention is to provide an extender for a thimble guide to shield an additional portion of the thimble from cross-currents and to absorb vibration from the thimble and transfer such vibration to the thimble guide and thence to the core plate.

Another object of the present invention is to provide a thimble guide extender having a spring element which contacts the thimble to receive vibrations.

These and other objects can be attained by providing a vibration-damping thimble guide extender which includes an extension element having a thimble passage, means for mounting the extension element on a thimble guide so that the thimble passage is aligned with the thimble channel in the thimble guide, a spring bushing, and means for mounting the spring bushing on the extension element so that at least a portion of the spring element is positioned to contact the thimble.

DESCRIPTION OF THE PREFERRED EMBODIMENTS

Figure 3A:
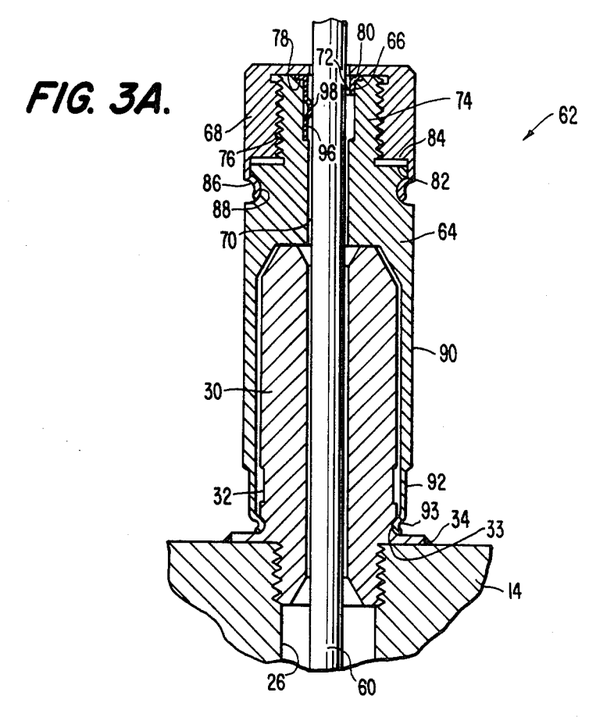
FIG. 3A is a sectional view illustrating a vibration-damping thimble guide extender in accordance with an embodiment of the present invention.

With initial reference to FIG. 3A, vibration-damping thimble guide extender 62 according to the present invention includes an extension element 64, a spring bushing 66, and a threaded cap 68 which secures bushing 66 to element 64. Element 64 is generally cylindrical in form and is provided with a thimble passage 70 to accommodate thimble 60. The upper passage 72 of thimble portion 70 has a diameter slightly greater than the diameter of the lower portion of passage 70 to provide room for bushing 66.

With continuing reference to FIG. 3A, element 64 is provided with a protruding portion 74 having a threaded periphery 76 to receive the matching threads of cap 68. An annular groove 78 at the upper end of portion 74 receives the collar 80 of bushing 66. Cap 68 clamps collar 80 and thus bushing 66 to extension element 64. Upper shoulders 82 of element 64 are spaced slightly apart from the bottom 84 of cap 68 when cap 68 is fully tightened. This gap is provided to ensure that, when cap 68 is screwed onto element 64, it "bottoms out" or is tightened against collar 80 and the top of portion 74 rather than shoulders 82. Four locking fingers 86 extend downward from cap 68 and are configured to engage annular groove 88 in element 64 to ensure that cap 68 does not become dislodged during use. Locking fingers 86 are provided by machining a thin cylindrical flange (not illustrated) from the workpiece (not illustrated) when cap 68 is being fabricated, machining away parts of this flange to provide four legs (not illustrated), inserting the workpiece into a jig (not illustrated) having openings at the legs, and inserting a tool through the openings to deform the metal as illustrated.

With continuing reference to FIG. 3A, the lower portion of element 64 is configured as a cylindrical shell 90 which envelopes the sides of guide 30. Four locking fingers 92 extend from shell 90 and terminate in knuckles 93 which engage groove 33 to secure element 64 to guide 30. Fingers 92 and their knuckles 93 may be provided by making shell 90 longer than is illustrated in FIG. 3A when element 64 is being fabricated, and by then reducing the wall thickness of the lower portion. Part of this thin-walled region is then removed to provide fingers 92, which are subsequently deformed to provide knuckles 93.

Locking fingers 92 and their knuckles 93 permit extender 62 to be retrofitted into an existing reactor 6 when it is shut down for refueling. The installation can be accomplished by remote control or by divers who are provided with shielding and who limit their exposure. Extender 62 is simply lowered axially onto a thimble guide 30 until knuckles 93 snap into the groove 33. Extender 62 may, of course, also be installed during fabrication of a new reactor. In the latter case element 64 may be secured by spot welding, etc., instead of by fingers 92 and knuckles 93.

Figure 3B:
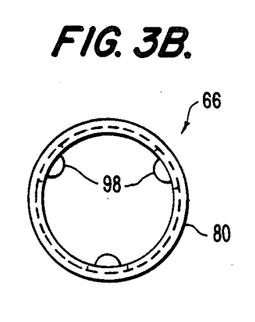
FIG. 3B is a top plan view of the spring bushing employed in FIG. 3A.
Figure 3C:
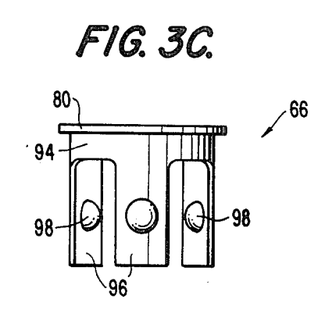
FIG. 3C is a front elevational view of the spring bushing of FIG. 3B.

Turning next to FIGS. 3B and 3C, it will be seen that collar 80 of spring bushing 66 is joined by a short cylindrical portion 94 to three legs 96, each having a dimple 98 therein. Bushing 66 is preferably fabricated from a tubular segment (not illustrated) of "Inconel," a nickel alloy. The tube is flared at one end to provide collar 80 and cut at the other end to provide legs 96. The workpiece is then inserted in a jig (not illustrated) having openings to receive tools (not illustrated) which deform legs 96 to provide dimples 98. Alternately, dimples 98 may be provided before legs 96 are cut. Although not illustrated in the drawings legs 96 are bent inward by a few degrees, so that they are no longer parallel, to complete the fabrication of bushing 66.

Returning to FIG. 3A, the operation of bushing 66 will now be described. First, it will be apparent that extender 62 shields a segment of thimble 60 that would otherwise be exposed to cross-currents below the bottom nozzle 17 (see FIG. 2). The upper surface of cap 68 is preferably spaced apart from the bottom of platform portion 20 (see FIG. 2) of the bottom nozzle 17 by about one quarter inch (0.64 cm), so that only a small portion of thimble 60 is exposed to turbulence. Furthermore, dimples 98 extend into thimble passage 70 and physically touch thimble 60. This contact transfers vibration from thimble 60 to bushing 66, which transfers the vibration to extension element 64, which in turn transfers the vibration to thimble guide 30. Dimples 98 are rounded so that, even with the slight inward bend of legs 96, there is no danger that the upper end (not illustrated) of thimble 60 will be snagged by dimples 98 when thimble 60 are re-inserted into a fuel assembly 16 (FIG. 2) following refueling.

Figure 4:
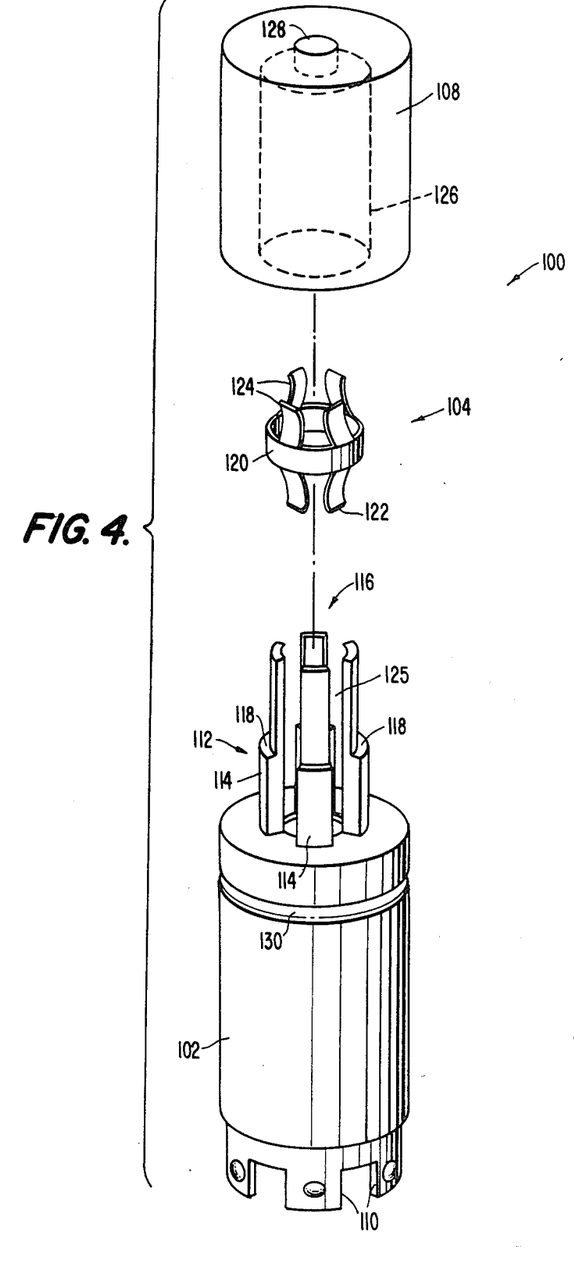
FIG. 4 is an exploded perspective view of a vibration-damping thimble guide extender in accordance with a second embodiment of the present invention.

Turning next to FIG. 4, extender 100 of the present invention includes an extension element 102, a spring bushing 104, and a cap 108. Element 102 is provided with a cylindrical shell having the same configuration as shell 90 (FIG. 3A) and with dimpled locking fingers 110 which snap into groove 33 of guide 30 (FIG. 2). Protruding portion 112 comprises four support members 114 disposed around thimble passage 116. Each support member 114 is provided with a shoulder 118 to support cylindrical portion 120 of bushing 104. Portion 120 is secured to portion 112 by welds (not illustrated).

Four generally C-shaped spring legs 122 extend from the bottom of portion 120 and, similarly, four generally C-shaped spring-legs 124 extend from the top. When portion 120 is supported by shoulders 118 and welded to portion 112, legs 122 and 124 extend into the slots 125 between members 114 and into thimble passage 116. The C-shaped configuration of legs 112 and 124 ensures that thimble 60 (see FIG. 2) will not be snagged when it is inserted into fuel assembly 16.

Cap 108 includes a cavity 126 for accommodating portion 112 and bushing 104, and has an opening 128 for thimble 60 (see FIG. 2). Cap 108 is secured to element 102 by welding. Although cap 108 does not include locking fingers (reference number 86 in FIG. 3A), element 102 may be provided with an annular groove 130 for engagement by a tool (not illustrated) if extender 100 is to be installed onto a guide 30 by remote control.

Figure 5:
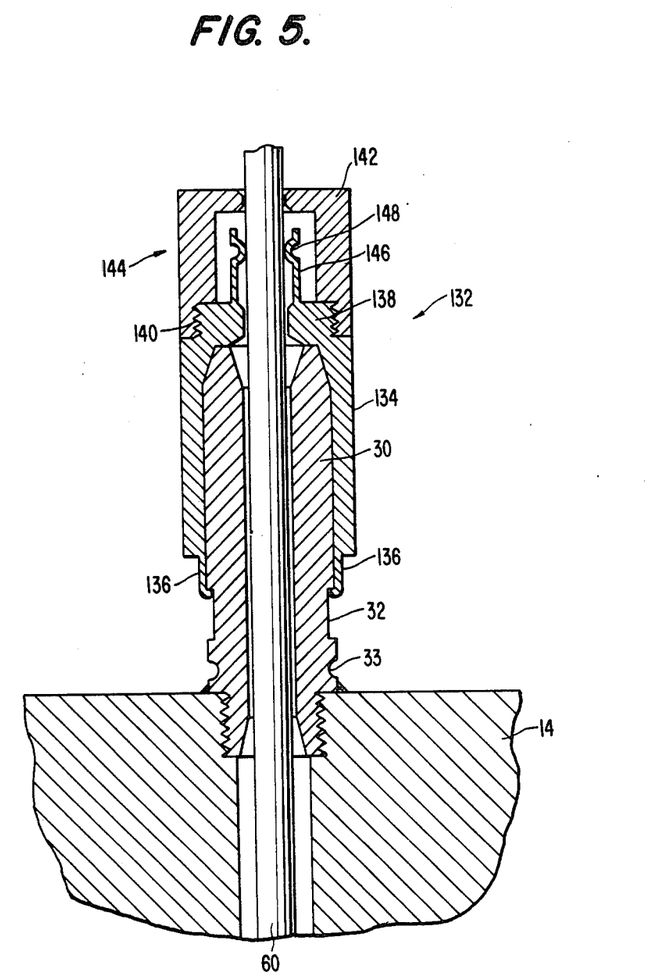
FIG. 5 is a sectional view illustrating a vibration-damping thimble guide extender according to a third embodiment of the present invention.

Turning next to FIG. 5, a vibration-damping extender 132 includes an extension element 134 having locking fingers 136 which extend into wrench-engaging region 32 of thimble guide 30 rather than into annular groove 33. It will be apparent that portions of groove 32 will be shallower than others, and accordingly it is desirable to provide a number of locking fingers 136 to ensure that some of them engage the deepest portions of region 132 regardless of the rotational orientation of extender 132 when it is installed. For example, it will be apparent that, if twelve equally spaced fingers 136 are provided, six of these fingers would engage the deepest portions of a hexagonally shaped region 32 if the remaining six engage the shallowest portions. A slight rotation of extender 132 with respect to thimble guide 30 would result in moderate engagement by all twelve fingers 136. If desired some of the fingers 136 can be slightly longer than others in order to provide a range of locking positions. In this case the longer fingers 136 would secure element 134 even if the shorter ones do not quite reach region 32, or the shorter fingers 136 would secure element 134 even if the longer fingers 136 extended sightly beyond the upper shoulder of region 32.

A thimble passage (not numbered) extends through extension 138 of element 134, the outer periphery of extension 138 being threaded at 140 so that threaded cap 142 can be secured. In the embodiment of FIG. 5 spring bushing 144 is not provided as a separate element. Instead, bushing 144 is comprised of spring legs 146 which are integral with element 134 and which are fabricated in a manner similar to that discussed above with respect to locking fingers 92 (FIG. 3A). Legs 146 are provided with dimples 148 to contact thimble 60.

From the foregoing discussion it will be apparent that the present invention provides a thimble guide extender which shields the thimble from turbulence and which includes spring means for contacting the thimble and absorbing vibration from it. The spring means may be provided by a separate element having one or more dimples or one or more legs that are bent to touch the thimble, or the spring means may be provided as members that are integral with the extension element.

It will be understood that the above description of the present invention is susceptible to various modifications, changes, and adaptations, and the same intended to be comprehended within the meaning and range of equivalence of the appended claims.

I claim:

1. An extender for a thimble guide which has a bottom end that is mounted on a lower reactor core plate having a bore therein, a top end that is spaced apart from an aperture in the bottom nozzle of a fuel assembly supported by the core plate, and sides defining an elongated channel between the top and bottom ends to accommodate an elongated thimble which movably extends through the bore and into the channel, said extender comprising:
 an extension element having a thimble passage therein;
 means mounting said extension element on said thimble guide so that said thimble passage communicates with the channel of said thimble guide;
 a spring bushing; and
 means mounting said spring bushing on said extension element so that at least a portion of said spring bushing is positioned to contact said thimble.

2. The extender of claim 1, wherein said spring bushing comprises at least one spring leg that is unitary with said extension element.

3. The extender of claim 1, wherein said thimble guide has an annular groove, and wherein said means mounting said extension element on said thimble guide comprises at least one locking finger which extends from said extension element and into said groove.

4. The extender oof claim 1, wherein said thimble guide has a wrench-engaging region, and wherein said means mounting said extension element on said thimble guide comprises at least one locking finger which extends from said extension element and into said wrench-engaging region.

5. The extender of claim 1, wherein said spring bushing comprises a member having at least one spring leg, and wherein said means mounting said spring bushing comprises means for mounting said member so that said at least one spring leg extends into said thimble passage.

6. The extender of claim 5, wherein said at least one spring leg has a dimple therein.

7. The extender of claim 5, wherein said at least one spring leg has a bent portion that is generally C-shaped.

8. The extender of claim 1, wherein said extension element comprises a protruding portion through which said thimble passage runs, wherein said spring bushing comprises a collar and a plurality of spring legs operatively connected to said collar, said spring legs extending into said thimble passage, and wherein said means mounting said spring bushing comprises means for clamping said collar to said protruding portion.

9. The extender of claim 8, wherein each spring leg has a dimple therein.

10. The extender of claim 8, wherein said protruding portion has an outer surface that is threaded, and wherein said means for clamping comprises a threaded cap that is screwed to said protruding portion, said cap having an opening therein for passage of said thimble.

11. The extender of claim 10, wherein said cap has a bottom surface and wherein said extension element has a shoulder region disposed adjacent said protruding portion, said bottom surface being spaced apart from said shoulder region.

12. The extender of claim 10, further comprising at least one locking finger, said at least one locking finger being attached to one of said cap and said extension element and engaging the other of said cap and said extension element to further secure said cap to said extension element.

13. The extender of claim 1, wherein said extension element comprises a protruding portion through which said thimble passage runs, said protruding portion having at least one slot therein, and wherein said spring bushing comprises at least one spring leg which is secured to said protruding portion and which extends through said at least one slot and into said thimble passage.

14. The extender of claim 13, wherein said at least one spring leg has a bent portion that is generally C-shaped.

15. The extender of claim 13, wherein there are a plurality of slots which divide said protruding portion into a plurality of spaced apart support members, wherein said spring bushing comprises a cylindrical portion to which a plurality of spring legs are attached, said spring legs extending between said support members, and wherein said means mounting said spring bushing comprises means for affixing said cylindricl portion to said support members.

16. The extender of claim 15, further comprising a cap secured to said extension element and enclosing said spring bushing, said cap having an opening for passage of said thimble.

17. In a nuclear reactor which includes a lower reactor core plate with a bore therein, a fuel assembly which is supported by the core plate above the bore and which has a bottom nozzle with an aperture therein, a thimble guide having a bottom end which is mounted on the core plate, having a top end which is spaced apart from the aperture in the bottom nozzle of the fuel assembly, and having sides defining an elongated channel between the top and bottom ends, and an elongated thimble which movably extends through the bore and into the channel, a thimble guide extender comprising:
 a metallic extension element having a thimble passage therein;
 means mounting said extension element on said thimble guide so that said thimble passage communicates with the channel of said thimble guide;
 a spring bushing; and
 means mounting said spring bushing on said extension element so that at least a portion of said spring bushing is positioned to contact said thimble.

18. A nuclear reactor, comprising:
 a lower reactor core plate with a bore therein;
 a fuel assembly which is supported by the core plate above the bore and which has a bottom nozzle with an aperture therein;
 a thimble guide having a bottom end which is mounted on the core plate, a top end which is spaced apart from the aperture in the bottom nozzle of the fuel assembly, and sides defining an elongated channel between the top and bottom ends;

an elongated thimble which movably extends through the bore and into the channel, and a thimble guide extender, said thimble guide extender including an extension element having a thimble passage therein, means mounting said extension element on said thimble guide so that said thimble passage communicates with the channel of said thimble guide, a spring bushing, and means mounting said spring bushing on said extension element so that at least a portion of said spring bushing is positioned to contact said thimble.

* * * * *